June 28, 1966    C. P. WALES    3,258,671
METHOD FOR INCREASING THE CAPACITY OF SILVER ELECTRODES
Filed March 29, 1963    2 Sheets-Sheet 1

INVENTOR.
CHARLES P. WALES
BY
ATTORNEY

June 28, 1966          C. P. WALES          3,258,671

METHOD FOR INCREASING THE CAPACITY OF SILVER ELECTRODES

Filed March 29, 1963          2 Sheets-Sheet 2

INVENTOR.
CHARLES P. WALES

United States Patent Office 3,258,671
Patented June 28, 1966

3,258,671
METHOD FOR INCREASING THE CAPACITY OF SILVER ELECTRODES
Charles P. Wales, Alexandria, Va., assignor to the United States of America as represented by the Secretary of the Navy
Filed Mar. 29, 1963, Ser. No. 269,220
5 Claims. (Cl. 320—22)

The invention described herein may be manufactured and used by or for the Government of the United States of America for governmental purposes without the payment of any royalties thereon or therefor.

This invention relates to a method for increasing the discharge capacity of silver electrodes and more particularly to an improved method for charging storage cells or batteries containing silver electrodes whereby the energy content of said cells or batteries is increased considerably.

It is highly desirable to be able to charge the silver electrode to higher capacity, since storage batteries that contain positive silver electrodes are costly and are used mainly for purposes requiring an energy source of large capacity but of smaller size and weight than the conventional storage batteries of similar capacity. Although these batteries discharge readily at high rates, experience has shown that the positive silver electrode is difficult to charge, except at low rates of current and at a peak capacity which approximates half of the theoretical.

Therefore, one of the objects of the present invention is to provide a method for increasing the discharge capacity of silver electrodes.

Another object of the invention is to provide an improved method for charging a battery or cell which contains positive silver electrodes whereby a higher peak capacity is obtained than by the previous charging methods.

A further object of the invention is to provide a method for storing increased amounts of electrical energy in alkaline storage batteries, such as, the silver-zinc or the silver-cadmium battery.

Still other objects and advantages will become apparent to those skilled in the art in the light of the following description.

Figure 1:
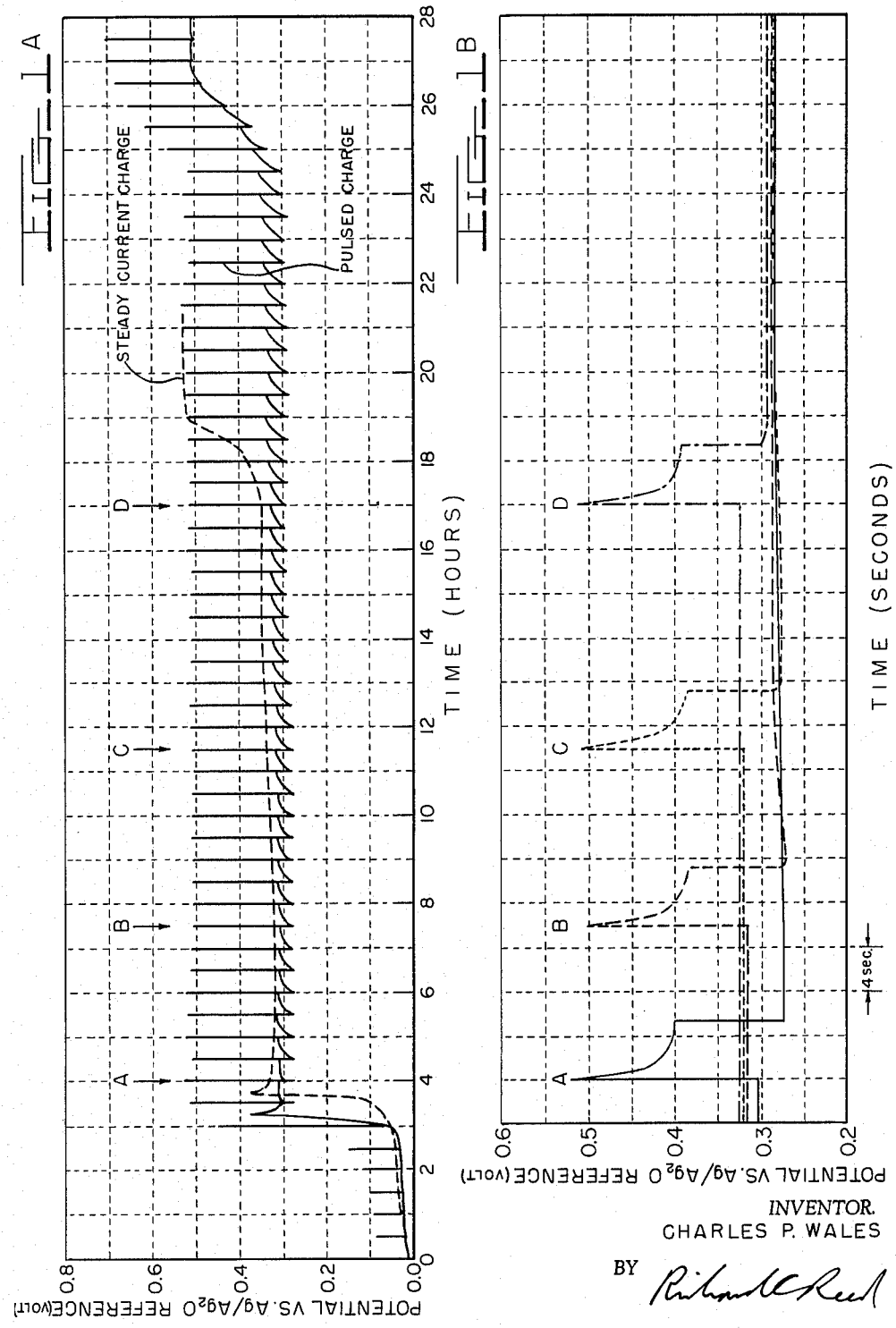
FIG. 1A is a graphic representation of charges on a silver electrode by means of a steady flow current and by a pulsed current in accordance with the invention.
FIG. 1B shows the pulses indicated in FIG. 1A on an expanded time scale.
Figure 2:
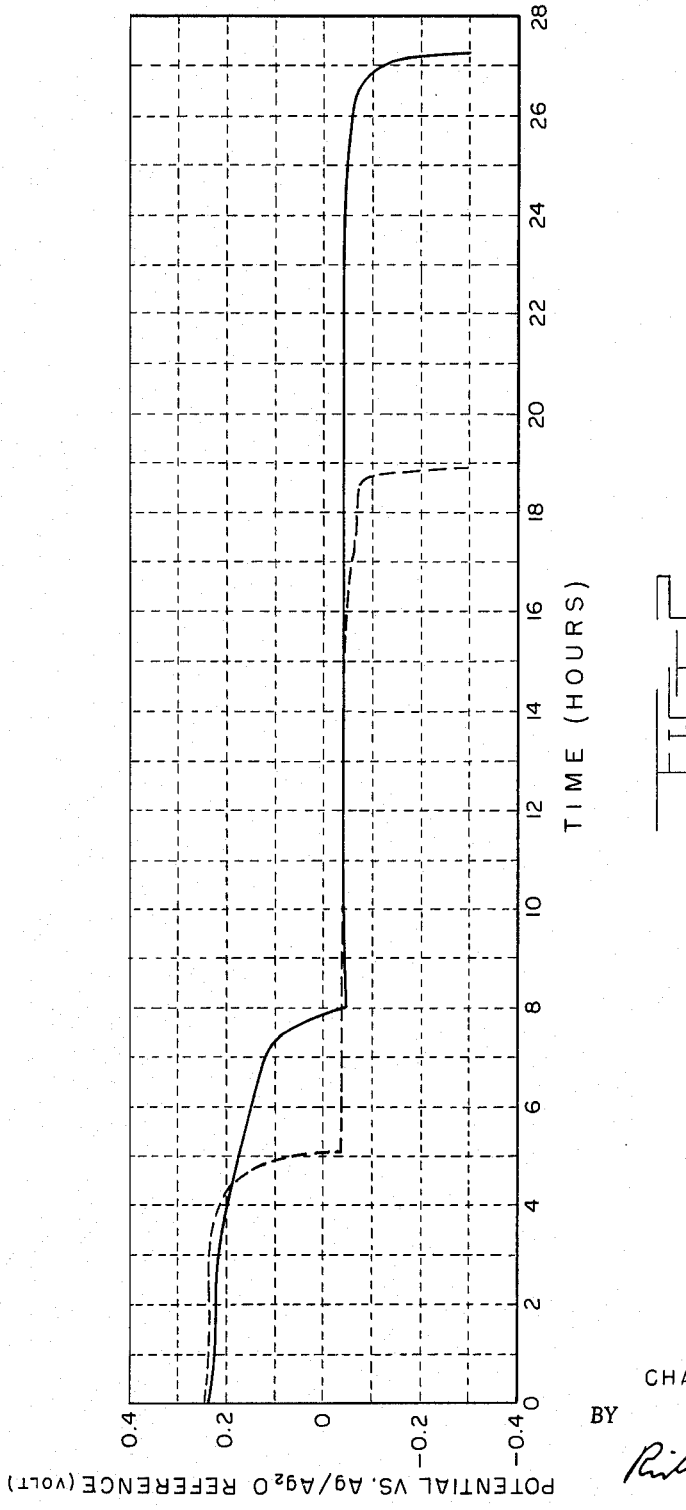

FIG. 2 graphically compares the discharge of the electrode charges of FIG. 1A.

In accordance with the present invention, the silver electrode becomes more highly charged by employing a charging current of relatively steady flow which is periodically increased to higher values for short periods of time. The charging current may also comprise a direct current of relatively steady flow on which a second D.C. current is superimposed periodically in the same direction. The resulting current provides a charging current of unidirectional flow with uniform D.C. pulses added to the current flow at regular intervals.

In the present method, the charging current may be suitably supplied from a D.C. source by stepping up the current to provide pulses at regular intervals and for short durations. The charging current may be alternately supplied by including steps to combine two sources of direct current connected in parallel across a cell or battery which is to be charged. One source of direct current is held steady during the charging operation and constitutes essentially the basic charging current normally employed for charging silver electrodes at charging rates of about 16–24 hours. The second source of current supplies pulses of current at regular intervals, the duration of pulse being controlled in the well-known manner by a cycle timer. The pulse current may range from one to several times the value of the steady current flow. The desired charging effects in accordance with the invention depend to a very great extent upon the proper choice of pulse current, pulse length and pulse interval (frequency).

The beneficial effect obtained as a result of the present invention is noted during the discharge cycle of silver electrodes. When pulses of suitable pulse current, pulse length and frequency are employed for a given electrode configuration and size, the discharge capacity of the electrode is increased as much as 50% over previous charges that did not employ pulses.

When pulses of current are added to a basic charging current normally employed in a 20-hour rate charge, the discharge capacity reaches a maximum and then decreases with increasing pulse current or pulse length. As pulse length is increased, pulse current has to be decreased to obtain the maximum capacity, but not linearly, for the quantity of pulse current needed for maximum discharge capacity also increases.

In accordance with prior art charging, a silver-zinc cell containing an alkaline electrolyte, preferably of 35% KOH solution, utilizes the silver metal to the extent of about 45 to 53% of the total silver available in the electrode. The metal utilized is based upon the amount of silver which is oxidized (anodized) during the charging operation. When pulses of current are combined with the basic charging current according to the present method, the utilization of silver based on the amount that becomes oxidized may be increased to a greater extent, as high as 76% of the total metal content. Under varying conditions of pulse current, pulse length and pulse frequency, as previously explained, an increase in discharge capacity of about 30 to 40% is readily obtained by means of the present charging method.

*Test electrodes*

In order to test the effect of pulses of current on a basic charge current in accordance with the invention, silver test electrodes measuring about 30.5 mm. x 63.5 mm. x 0.8 mm. and having a normal charge capacity of about 1.9 amp.-hours were assembled in pairs in closed plastic containers having an excess of 35% KOH electrolyte. A reference electrode, $Ag/Ag_2O$, was included in each container and used for all potential measurements. A D.C. source of current was held steady during the charge at 100 ma. (approximately the 20-hour rate) and a second source of D.C. supplied pulses at regular intervals by means of a cycle timer.

The potential of the test electrodes was measured against the reference electrode, and their capacity was thus determined separately from the changes occurring in the cell potential.

The reference electrode is used when it is desired to know the potential of the positive or negative electrode alone. Since the charge and discharge currents do not flow through this reference electrode, its potential does not change as the cell is charged or discharged, and it has no effect on the cell capacity. The $Ag/Ag_2O$ half cell is well known in the art and investigators have shown that it is capable of providing a steady potential—a requisite for a reference electrode.

Charges employing test electrodes that are used for comparison between a conventional charge and a charge that includes pulses are represented graphically in FIG. 1A. The dotted line shows a typical charge of a silver electrode carried out in the usual manner by means of a charging current held constant at 100 milliamperes, which is approximately the 20-hour charging rate for the test electrodes. The solid line shows a charge of the same electrode using the same basic charging current of 100 milliamperes but which also combined pulses that increased the charge current periodically to 10 times the basic 100-milliampere charge rate. The pulsed current added 900 milliamperes of additional current for 5 seconds every half hour.

The addition of pulses had little effect early in the charge or at the end of the charge when most of the current was going to gas evolution. It will be noticed that the charge operation involved three potential plateaus and that the first plateau corresponds to the formation of $Ag_2O$, the second potential plateau in which $Ag_2O$ is oxidizing to $AgO$ and the third potential plateau in which the reaction is almost entirely the evolution of $O_2$. The pulses were most effective at the second potential plateau, designated as the $Ag_2O/AgO$ level. The pulsations are shown in the graph as a series of vertical lines. A lower charging potential resulted after each pulse period, but the potential gradually approached to the normal level (as indicated by the dotted line).

FIG. 1B indicates the potential at several points during the charge, shown by the solid line of FIG. 1A. The potentials shown are given by the four pulses indicated by the letters A, B, C and D in FIG. 1A; the potentials are presented in an expanded time scale. The potential after reaching a maximum decreased during the few seconds of the pulse interval. FIG. 1B shows that after the pulse was terminated, the potential was usually less than it had been prior to the pulse.

The discharge characteristics of the silver electrode following the charge operations presented in FIG. 1A are shown graphically in FIG. 2. The discharge of the conventional prior art method and the pulse-charged electrodes of the present method were carried out at a constant current rate of 100 ma. The dotted line shows the discharge after the steady current charge was completed. Discharges were begun immediately following the charge operation. The solid line shows the discharge following the 100 ma. charge which included a 900 ma. additional charge current pulsed for 5 seconds every half hour (shown as a solid line in FIG. 1A). Obviously, the increased capacity of this battery is indicated by the extended discharge period.

The effect of pulses of charge current on silver electrodes is clearly indicated in the following table of discharges of silver electrodes in 35% KOH electrolyte. Charges and discharges were carried out at 100 ma. Mean normal capacity was 1.89 amp.-hours.

[Discharge capacity in amp.-hours]

| Total Current During Pulse (Ma.) | Pulse Length (Sec.) | Discharge capacity (Amp.-hr.) | | |
|---|---|---|---|---|
| | | 10 Min. Pulse Frequency | 30 Min. Pulse Frequency | 60 Min. Pulse Frequency |
| 200 | 2.5 | 2.06 | 2.16 | 2.13 |
| 200 | 5 | 2.46 | 2.53 | 1.89 |
| 400 | 2.5 | 2.52 | 2.49 | 2.37 |
| 200 | 10 | 2.23 | 2.33 | 2.30 |
| 400 | 5 | 2.68 | 2.94 | 2.24 |
| 1,000 | 2.5 | 2.50 | 2.62 | 2.36 |
| 400 | 10 | 2.48 | 2.69 | 2.72 |
| 1,000 | 5 | 2.31 | 2.72 | 2.19 |
| 2,000 | 2.5 | 1.68 | 2.53 | 2.13 |
| 1,000 | 10 | 1.89 | 2.40 | 1.92 |
| 2,000 | 5 | 1.88 | | 1.54 |
| 2,000 | 10 | | 1.57 | |

By adding 1.6 volts to the potential scales given in FIGS. 1A, 1B and 2, the value will be equal approximately to the potential measured in a silver-zinc battery under the same conditions, assuming that the silver-zinc battery is made in the customary way with the zinc electrodes having an excess of capacity over the silver electrodes so that the silver electrodes limit the charge and discharge capacity.

The concentration of the KOH electrolyte which has been found to be suitable for the practice of the present invention is approximately in the range between 25–40%, although the preferred alkaline electrolyte employed is approximately a 35% KOH solution at a temperature of about 25° C.

While no attempt is made to explain the exact mechanism of the reaction which takes place when pulses of current are passed through an alkaline cell or battery in reverse direction to the normal flow of current on discharge, it is believed that the pulses of charge current ruptures the film of AgO that forms on the electrode surface and thus allows the oxygen or silver to penetrate more readily through the AgO layer and to move to proper sites in the AgO lattice during the periods of steady current flow.

It will be clear to those skilled in the art that the present method provides for increased discharge capacity for silver electrodes which have been difficult to charge effectively by conventional methods. The method is especially useful for increasing the peak capacity of the silver-zinc and silver-cadmium alkaline batteries.

Obviously many modifications and variations are possible in the light of the above teachings. It is to be understood, therefore, that within the scope of the appended claims, the invention may be practiced otherwise than as specifically illustrated and described.

What is claimed is:

1. The method of increasing the capacity of a silver electrode in a storage battery which comprises:
    passing a direct current of steady flow through said electrode at a relatively low charging rate; and
    increasing said current flow in a step-like manner at regular time intervals for a short time in comparison to the time of one of said intervals to increase the charge acceptance of said electrode.

2. The method of increasing the capacity of a silver electrode in a storage battery which comprises:
    passing a direct current of steady flow through said electrode at a relatively low charging rate; and
    superimposing on said current flow periodic uniform pulses of direct current of the same polarity as said current flow on said current flow to increase the charge acceptance of said electrode.

3. The method of increasing the capacity of a silver electrode in an alkaline storage battery which comprises:
    passing a direct current of steady flow through said electrode at a relatively low charging rate; and
    simultaneously passing through said electrode pulses of direct current of the same polarity as said steady flow current, said pulses occurring at regular time intervals and having a predetermined duration to thereby increase the charge acceptance of said electrode.

4. The method of increasing the capacity of positive silver electrodes in an alkaline storage battery which comprises:
    passing a direct current of steady flow through said electrodes at a relatively low charging rate; and
    superimposing on said steady flow current uniform pulses of direct current of the same polarity as said steady flow current, said pulses having a predetermined pulse frequency and duration such as to increase the charge acceptance of said electrodes.

5. The method of increasing the electrical energy of an alkaline storage battery having positive silver electrodes comprising:
    passing a direct current of relatively steady flow through said electrodes at a relatively slow charging rate; and
    superimposing on said steady flow current uniform pulses of direct current of the same polarity as said steady flow current, said pulses having a predetermined pulse frequency and duration,
    the amplitude of said pulse current being from about one to ten times the value of the amplitude of said steady flow current.

References Cited by the Examiner

UNITED STATES PATENTS 2,752,550   6/1956   Beer _____ 320—4

OTHER REFERENCES

Battery Chargers and Charging, Harvey, 1953, pages 50, 59.

Radio Electronics, December 1956, page 49, Dry Cells Can Be Reactivated.

Trans. Electrochemical Society, vol. 29, 1916, Depolarization by Electrical Waves.

JOHN F. COUCH, *Primary Examiner.*

LLOYD McCOLLUM, *Examiner.*

S. WEINBERG, *Assistant Examiner.*